United States Patent [19]

Gocke et al.

[11] 4,013,088

[45] Mar. 22, 1977

[54] VALVE STRUCTURE

[75] Inventors: Eberhard Gocke; Rudolf Vollmer, both of Mosbach, Germany

[73] Assignee: Braukmann Armaturen AG, Rothrist, Switzerland

[22] Filed: May 19, 1975

[21] Appl. No.: 579,009

[52] U.S. Cl. .................................. 137/116; 137/218
[51] Int. Cl.² .......................................... F16K 45/00
[58] Field of Search ........................... 137/218, 116

[56] References Cited
UNITED STATES PATENTS

| 3,747,621 | 7/1973 | Tine | 137/218 |
| 3,818,929 | 6/1974 | Braukmann | 137/218 |
| 3,906,987 | 9/1975 | Rushforth | 137/218 |

*Primary Examiner*—Robert G. Nilson
*Attorney, Agent, or Firm*—William T. Howell

[57] ABSTRACT

A valve structure has a body with an inlet, an outlet and an intermediate by pass aperture. A pair of identical check valves are located in the body, one to each side of the aperture. The check valve nearest the inlet has a slidable housing, movable to cover the aperture, biased away from the fixed housing of the second check valve by a spring. The check valves are closable by individual springs in the direction of the inlet but the individual springs are stronger than the spring separating the housings.

7 Claims, 1 Drawing Figure

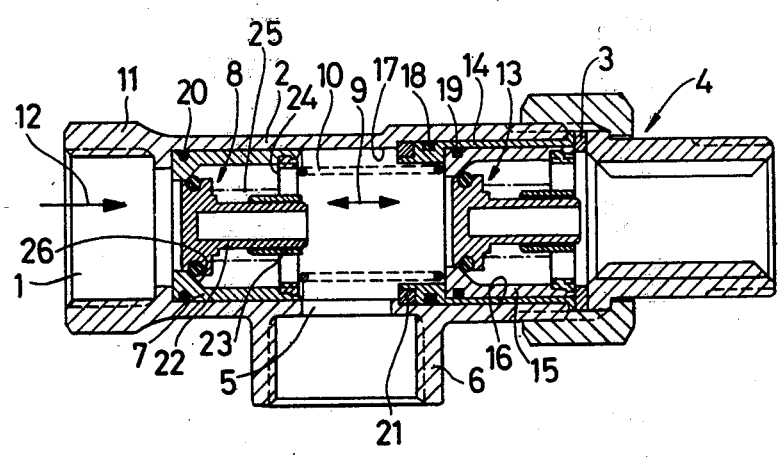

VALVE STRUCTURE

FIELD OF INVENTION

The invention relates to a valve structure, more particularly to prevent backflow, especially for house-hold water pipes, the said valve structure having a body containing an inlet aperture, an outlet aperture, and at least one by-pass aperture, check-valves being located both before and after the said by-pass aperture, as seen in the direction of flow, and both check-valves closing in the same direction, the first check-valve acted upon by the flow having a sleeve-like valve housing displaceable within the valve body and sealed off therefrom, the said sleeve-like check-valve housing being kept in place by means of a compression spring which is weaker than either of the check-valve closing springs, and the by-pass aperture being closed off from the interior of the check-valves whenever the said sleeve-like check-valve housing is in its terminal displacement position.

Valve structures to prevent backflow are already known per se. They may be inserted, for example, into the line supplying water under pressure to a washing machine or the like. Now operating conditions may arise during which inadequate pressure causes the direction of flow in the feed line to reverse. This could allow wash sediment or other unpotable liquids to enter the fresh-water line. The valve structure according to the invention is intended to prevent any such return suction of used or contaminated water, or other liquids, into the fresh-water line. The check-valves, arranged in series, ensure that if one of them fails, the other can take over satisfactorily by itself. The by-pass aperture makes it possible to empty the space in the valve body between the two check-valves.

It is the purpose of this present invention to provide a valve structure of the type mentioned above, the diameter of which is as close as possible to that of the pipeline, and the design of which will make production as inexpensive as possible.

SUMMARY OF THE INVENTION

According to the invention, this purpose is achieved by means of a valve structure of the type mentioned above, characterised in that the two check-valves are of the same design, while the by-pass aperture runs radially in relation to the interrupter housing. This radial arrangement of the by-pass aperture makes it possible to use a valve body of relatively small diameter, as compared with existing designs, in which a complete circle of drain holes is arranged concentrically around the outlet aperture. Furthermore, this radial by-pass aperture may be covered, in a very simple manner, directly by the sleeve of the longitudinally displaceable check-valve whereas in the known valves it is impossible to cover the by-pass apertures directly. Finally, the use of two identical check-valves has the advantage of increasing the length of production runs, reducing production costs, and reducing the stock of spare parts. In one particularly preferred example of embodiment of the invention, the by-pass aperture is completely covered by the movable valve sleeve when the latter is in its terminal displacement position.

According to a further development of the invention, the stationary check-valve is located in a bush fitted tightly into the valve body. The inside diameter of this body must therefore be enlarged by at least the length of this bush. Naturally, the fixed check-valve housing is also sealed off from this bush as is also the case between the mobile check-valve and the valve body.

According to still another characteristic of the invention, the return spring for the mobile check-valve bears against both check valves. Thus the return spring, for example a spiral compression spring is inserted between the two check-valves and may therefore be prestressed, if necessary. In this case it is highly desirable for the inner end of the bush also to form a guide for the return spring.

According to another characteristic of the invention, the sleeve-like housing of the mobile check-valve, in its closed position, lies sealingly against the bush. The sealing of the by-pass aperture may be effected at this location alone or additionally. In the latter case, however, the covering of the by-pass aperture must be of sufficient length and the movement of the valve housing must be more or less free of play.

According to still another characteristic of the invention, a sealing ring is placed between the bush and the check-valve housing, the said sealing ring bearing particularly against an internal shoulder in the valve housing and against an external shoulder on the check-valve housing. These two shoulders eliminate the need for special attachment devices.

It is desirable for one end of the valve body, especially the inlet connector, to be provided with an internal thread, while the other end thereof is fitted with a threaded coupling. This makes it easy for the valve structure to be removed from a fixed length of pipeline.

The drawing illustrates an example of embodiment of the invention in the form of a longitudinal section through the valve structure.

DESCRIPTION OF THE PREFERRED EMBODIMENT

The valve structure according to the invention is installed in a length of pipeline, not shown. The medium enters body 2 through inlet aperture 1 and leaves through outlet aperture 3, to which a threaded coupling 4 may be screwed. Body 2 is of a sbustantially tubular configuration, the diameter thereof being only very slightly larger than that of the pipeline. Located between the inlet and outlet apertures, i.e. at about the middle of the body 2, is a by-pass aperture 5, to which is attached a short pipe connector 6 made integrally with body 2. By-pass aperture 5 is adapted to be closed off by housing 7 of a check-valve 8, the said housing 7 being in the form of a sleeve and being adapted to move back and forth within body 2, in the direction of double arrow 9, against the action of return spring 10. Check-valve 8 is associated with housing connector 11 and, in its initial position, this valve is located in front of by-pass aperture 5, as seen in the direction of flow 12, so that the said by-pass aperture is completely free. Located beyond by-pass aperture 5 is a second check-valve 13 which, according to the invention, is identical with check-valve 8, but which, in contrast thereto, is located immovably in body 2. Return spring 10 is fitted between check-valves 8 and 13, the right-hand end of the said spring, facing check-valve 13, being centred by the inner end of a bush 14 enclosing tubular housing 15 of check-valve 13.

Bush 14 enters expanded portion 16 of housing bore 17 and is sealed, in relation thereto, by means of an O-ring 18 fitted into an annular groove in bush 14. An additional O-ring 19, located in an annular groove in tubular housing 15 of check-valve 13, seals this housing from bush 14. Fitted between body 2 and housing 7 of check-valve 8 is a third O-ring 20 which, by reason of the similarity between the two check-valves, is located in a groove in check-valve housing 7. A housing for a sealing-ring 21 is provided by means of an inside shoulder in body 2 and an outside shoulder at the inner end of bush 14.

Valve cone 22 of each check-valve 8, 13 is mounted displaceably in a sleeve 23 retained in the check-valve housing by means of webs or arms 24. Both check-valves open in the direction of arrow 12 against the action of their closing spring 25, which is stronger than return spring 10.

As soon as a medium under a certain amount of pressure enters the valve body 2 through inlet aperture 1, check-valve 8 moves in the direction of arrow 12 from left to right. This compresses return spring 10, and by-pass aperture 5 is closed off by housing 7 of check-valve 8, O-ring 20 being located, in this case, in front of by-pass aperture 5, as seen in the direction of flow. At the same time, the inner, right-hand end of check-valve housing 7 bears against sealing ring 21. As soon as the pressure becomes high enough, valve cones 22 are lifted from their seats 26, and closing springs 25 are simultaneously compressed. This allows the medium to flow through the valve structure. When the pressure drops, valve cones 22 close again. Finally, i.e. when the pressure has decreased sufficiently, check-valve 8 also returns to its initial position, shown in the drawing, and by-pass aperture 5 is exposed.

We claim:

1. A valve structure having a body with an inlet, an outlet and an intermediate by-pass aperture, first and second check valve housings in said body and located respectively before and after said by-pass aperture in relation to the direction of flow, said second valve housing being sealingly secured to said body and said first check valve housing being sealingly but slidably engaged with said body and movable under flow pressure towards said second valve housing to close said by-pass aperture and a first spring bearing said first check valve towards said inlet, said check valve closing through individual springs, said first spring being weaker than said individual springs.

2. A valve structure according to claim 1 wherein said by-pass aperture runs radially in relation to said valve body and said check-valves are identical.

3. A valve structure according to claim 1 wherein said second check-valve housing is secured to a bush fitted sealingly into said valve body.

4. A valve structure according to claim 3 wherein the end of said bush adjacent said by-pass aperture constitutes a guide for said first spring.

5. A valve structure according to claim 3 wherein said first check-valve housing bears sealingly against said bush when said first housing closes said by-pass aperture.

6. A valve structure according to claim 3 wherein a sealing ring is located on said bush, said first check valve housing engaging said sealing ring on closing said bypass aperture, said sealing ring being secured between an inside shoulder to said valve body and a co-operating outside shoulder to said bush.

7. A valve structure according to claim 1 wherein said first spring bears against both housings.

* * * * *